United States Patent [19]
Carson et al.

[11] 3,818,285
[45] June 18, 1974

[54] TEMPERATURE MONITORING AND CONTROL SYSTEM

[76] Inventors: Kenneth G. Carson, 54 Wilstead Dr., New Market, Ontario; Andre Rekai, 50 Romulus Dr., Scarborough, Ontario, both of Canada

[22] Filed: July 6, 1973

[21] Appl. No.: 377,168

[30] Foreign Application Priority Data
    Apr. 16, 1973 Canada................................ 168858

[52] U.S. Cl.................................. 317/133.5, 328/6
[51] Int. Cl...................... G05d 23/22, H01h 47/26
[58] Field of Search.............. 317/132, 133.5; 328/6

[56]         References Cited
            UNITED STATES PATENTS
3,131,314   4/1964   Charlot, Jr...................... 317/133.5
3,671,815   6/1972   Eberle et al. ..................... 317/133.5

*Primary Examiner*—L. T. Hix
*Attorney, Agent, or Firm*—Lamont B. Koontz; Alfred N. Feldman

[57] ABSTRACT

An electronic control system for monitoring of temperature, and the control of a system that uses a thermocouple as a temperature sensor. The thermocouple voltage is first amplified and then compared to a time delayed voltage representative of the thermocouple's previous condition. On a rising temperature, the output switch means and load are immediately operated. On a drop in temperature, the comparison of the thermocouple output with the previous condition of the thermocouple allows for immediate deenergization of the output switch means and load. This arrangement has utility in monitoring of burner flames, and advances the art by allowing the use of a thermocouple as a flame safeguard device.

10 Claims, 2 Drawing Figures

TEMPERATURE MONITORING AND CONTROL SYSTEM

BACKGROUND OF THE INVENTION

Mechanical types of flaime sensors that utilize a differential expansion switching mechanism have been used for many years. Mechanical flame sensors consist of a metallic heat sensing component (such as a bimetal) which, when exposed to a temperature change, provide dimensional changes which are in turn utilized to operate an electrical switching mechanism. The switching mechanism is usually a single pole, double throw type of switch where one contact is made during the cold condition at the flame sensor component, while the other contact is made during the hot or heating condition of the flame sensor component. A normal characteristic in this type of switching mechanism is a clutched action. This clutched action provides the function of ignoring the switch actuator over travel, and the switching mechanism acts in response to a temperature change rather than to a specific level of temperature.

By way of example, if you assume that a flame sensing mechanism is at room ambient temperature, the switching mechanism will be in the cold position with one of its switches open and the other closed. If the flame sensing component is then exposed to a rising temperature, such as the flame of an oil burner, the switching mechanism will begin to react immediately. This will cause the cold contact to open and the previously open contact, which is known as the hot contact, to close. A further rise in the temperature at the sensing component of the mechanism will have no further effect on the switching mechanism. The over travel is consumed by a clutch slippage. This clutch retains the final switch actuator position where the hot contact has just closed. Any further increase in temperature at the sensing component is ignored. However, if the temperature at the sensing component is lowered, such as at a flame out, the switch actuator immediately reacts in the opposite direction, changing the switching mechanism from the hot contact made condition to a cold contact made condition. Following this function, the continuing decrease in temperature no longer affects the actuator position and the over travel is again consumed by the clutch. Thus, the flame sensing device senses a temperature direction, that is if the temperature is rising or falling, and does not require the device to reach a pre-set temperature before the switch actuation occurs.

This type of mechanical switch actuating mechanism or clutching mechanism has been used for sensing the operation of oil burners where the operating temperature has been relatively low. In more modern types of oil burners, such as burners known as "blue flame" burners, the temperature available at the burner can be much hotter than in the older style types of oil burners. This has created a problem in applying mechanical types of flame safeguard devices, and a new type of sensor is required.

SUMMARY OF THE INVENTION

The concept of the present invention is to produce the same effect in an electronic device as that now achieved by a mechanical device. The inventive electronic device has one application in monitoring of temperatures as those produced in "blue flame" burners, and utilizes a thermosensor which is used as a spot sensor. The flame sensor of the present invention is a thermocouple. This thermocouple device is capable of replacing any mechanical flame sensor.

In the present invention a thermocouple is exposed to the temperature to be monitored and has its signal amplified. The amplified signal is then fed to a comparator which compares the present thermocouple temperature with that of the temperature of the thermocouple at a previous time. If the temperature is rising, the comparator causes an output switch means to function thereby indicating a proper or safe condition. In the event that the temperature begins to decrease, the comparator senses this immediately and causes the output switch to be deactivated. The system does not wait for the thermocouple to reach a predetermined temperature, but acts on the rate or dimension of change of temperature at the thermocouple so that immediate switching action can be accomplished as soon as a change in temperature is sensed.

DESCRIPTION OF THE PREFERRED EMBODIMENT

Figure 1:
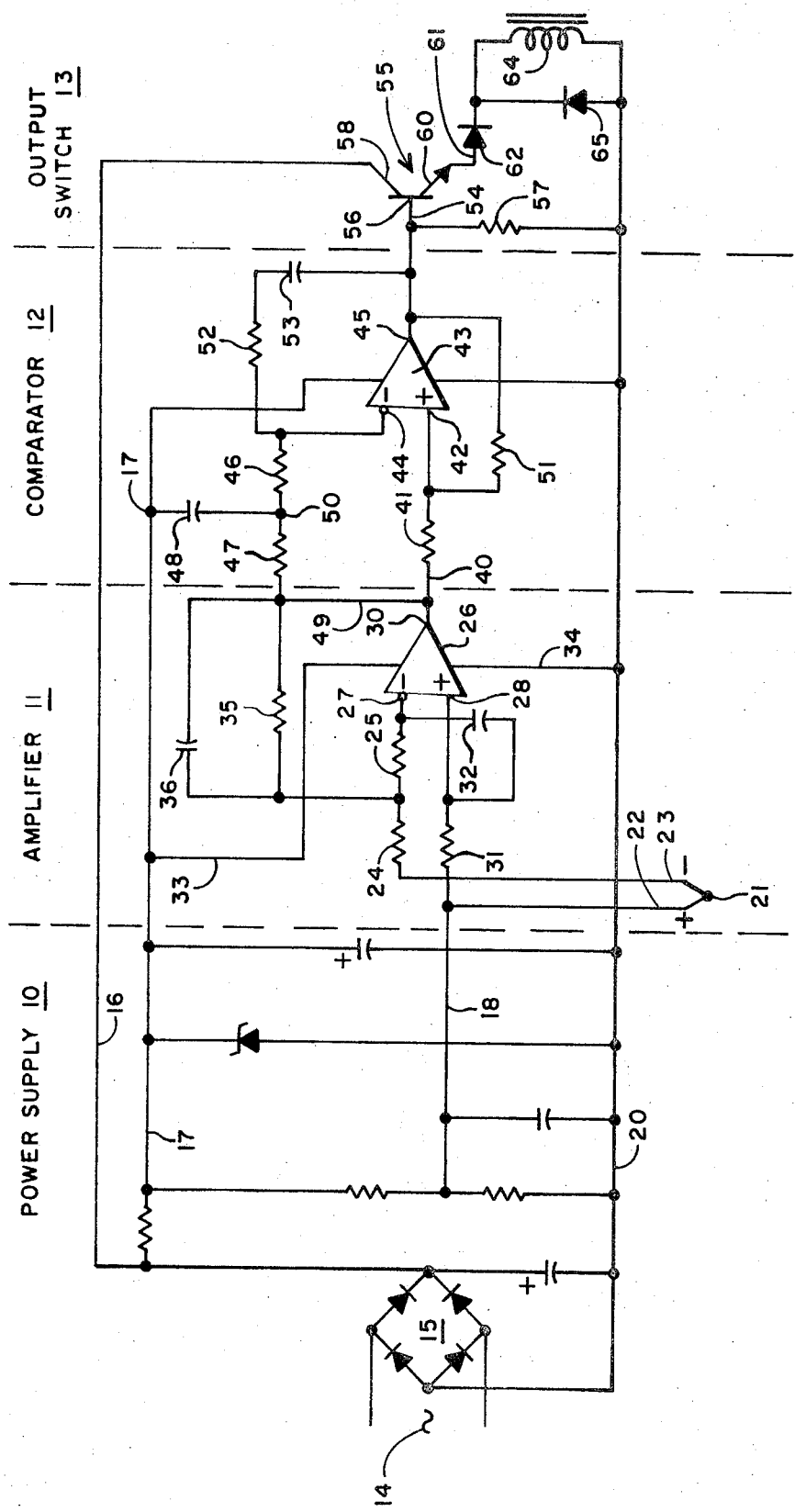
FIG. 1 of the present drawing is a detailed schematic drawing of a complete temperature monitoring and control system.

The present temperature monitoring and control system will be described as part of an oil burner safety device wherein an output switch is energized upon proving the existence of flame, and the same output switch is deenergized immediately upon the loss of flame.

The temperature monitoring and control system is made up of a power supply 10, an amplifier 11, a comparator 12, and an output switch means 13. These various elements will be described in detail below.

The power supply 10 is energized from an alternating current source 14, typically of a 24 volt magnitude. The 24 volt alternating current source would be normally available in an oil burner primary control. The alternating current voltage 14 is rectified by a bridge 15 and supplied as a direct current of three different magnitudes. The first direct current voltage is a filtered but unregulated voltage on conductor 16, while conductors 17 and 18 provide two regulated direct current potentials for use in the overall system. A common conductor or ground 20 is provided for the system. It is understood that the power supply means 10 is of any convenient design which provides the necessary voltage levels for operation of the balance of this system.

A thermocouple 21 is provided that is exposed to the flame to be monitored. The thermocouple has a positive conductor 22 and a negative conductor 23, with the positive conductor 22 connected to the reference voltage on conductor 18. The negative conductor 23 is connected through a resistor 24, and a resistor 25, to an operational amplifier 26. The operational amplifier 26 is of any conventional design and has an inverting terminal 27 and a non-inverting terminal 28, along with an output terminal 30. The resistor 25 connects to the inverting terminal 27, while the non-inverting terminal 28 is connected through a resistor 31 to the conductor 22 of the thermocouple 21. Connected between the inverting and non-inverting terminals is a capacitor 32.

The resistors 25 and 31 along with the capacitor 32 form a noise filter circuit to reduce any noise input from the thermocouple leads.

The operational amplifier 26 is powered from conductors 33 and 34 which connect respectively with the conductors 17 and 20. Connected from the output terminal 30 of the operational amplifier 26 to the inverting terminal 27 are a resistor 35 and a capacitor 36. Resistor 35 provides negative feedback setting-up the gain of the operational amplifier 26. Capacitor 36 is used as a noise filter.

With the arrangement described to this point any variations in voltage of the thermocouple 21 are provided on conductors 22 and 23 to the input terminals 27 and 28 of the operational amplifier 26. These voltage variations are amplified in a manner so that the terminal 30 varies with the magnitude of the input signal. The particular amplifier, by way of example, utilized in the actual circuit developed for the present invention has an amplification of 370. It can thus be seen that the variation in voltage of the thermocouple, which is a quite small voltage magnitude, is amplified very substantially and appears at terminal 30 as a substantial voltage change.

The output voltage at terminal 30 of operational amplifier 26 is fed to two different circuits. The first circuit is on conductor 40 through resistor 41 to a non-inverting terminal 42 of a second operational amplifier 43. The operational amplifier 43 has an inverting terminal 44 and an output terminal 45. The inverting terminal 44 is connected through a pair of resistors 46 and 47 to a conductor 49 that comes from the output 30 of the first operational amplifier 26. Also provided is a capacitor 48, that is connected between a common point 50 between the resistors 46 and 47 and the conductor 17. The combination of the resistors 46 and 47 along with the capacitor 48 provide the second input to the operational amplifier 43 at terminal 44 and this input is delayed in time by capacitor 48 with respect to the input provided on terminal 42 of the operational amplifier 43.

Connected between the output terminal 45 of the operational amplifier 43 and the input terminal 42 is a resistor 51. This resistor provides positive feedback causing hysteresis, and converts the operational amplifier 43 into a switch. The use of positive feedback in an operational amplifier of this type is conventional and the amplifier has a switching characteristic rather than a linear amplifying characteristic.

A resistor 52 and capacitor 53 are connected between the output terminal 45 and the inverting terminal 44 of the operational amplifier 43 to provide a further noise limiting circuit for the operational amplifier 43.

The output terminal of the operational amplifier 43 is connected by conductor 54 to a transistor generally disclosed at 55. The transistor 55 has a base 56 connected by a resistor 57 to the conductor 20. The transistor 55 further has a collector 58 connected to the conductor 16 to supply direct current filtered power to the transistor. The emitter 60 is connected to a conductor 61, through a light emitting diode 62, to a relay 64. The relay 64 is paralleled by a diode 65 which acts as a free wheeling diode to provide for the collapse of the magnetic field of the relay 64, as is conventional. The transistor 55 along with the light emitting diode 62 and the relay 64 provide an isolated output switch 13 for the system.

OPERATION

The function of the present invention is to act as a temperature monitoring and control system, and more particularly as a flame sensor. The present flame sensor uses the heating and cooling temperature at a thermocouple to operate a relay 64 to produce an isolated switch means output similar to a mechanical flame sensor utilized as is standard in an oil primary control. The present device uses a thermocouple 21 as a temperature sensor and it is primarily adapted for use in control of "blue flame" type oil burners.

If we assume that the flame sensor 21 is placed in a conventional application, the flame sensor circuit would be powered, at a stable state, with the transistor 55 "off." The capacitor 48 will become charged to the voltage difference between the conductor 17 and terminal 28 of the operational amplifier 26, and no voltage difference will appear across the terminals 42 and 44 of the operational amplifier 43. The charge path for the capacitor 48 is through the resistor 47, the resistor 35, the resistor 24, and the conductors 22 and 23.

If a rising temperature is applied to the thermocouple 21, the thermocouple 21 will have an output on conductors 22 and 23 with the inverting terminal 27 of the operational amplifier 26 becoming negative with respect to the terminal 28. This voltage difference between the terminals 27 and 28 is amplified and appears at terminal 30 as a rising voltage compared to ground or conductor 20. This output signal, applied to terminal 42 of the operational amplifier 43 through conductor 40 and resistor 41 is a positive voltage with respect to the voltage at the inverting terminal 44, since the inverting terminal 44 is held momentarily at a fixed level by the charge on capacitor 48. When the input voltage on terminal 42 is more positive than the voltage on terminal 44, the output voltage at terminal 45 goes positive, and, as no negative feedback resistor is employed, the amplifier gain is infinite, and the voltage output at terminal 45 will go to substantially the same voltage as that found on conductor 17. The rise in voltage at terminal 45 is connected to the base 56 of the transistor 55 and drives the transistor 55 into full conduction thereby causing it to act as a switch. The conduction of the transistor 55 immediately energizes the relay 64 pulling the relay in thereby indicating the presence of a flame at the thermocouple 21. The current flowing through the light emitting diode 62 can be used as an indicator. It indicates that the relay 64 has been energized and provides for a visual signal as to the state of the circuit.

As the temperature at the thermocouple 21 continues to rise no further change takes place in the circuit as this rising voltage is applied to the terminal 42 earlier than the terminal 44 because of the delay at capacitor 48. The system eventually reaches a saturated condition and any further rise has no effect on the system. This saturated signal is used to provide for any momentary flame flicker or unstable temperature plateau and has no effect on the relay operation.

If now a flame out occurs, the thermocouple 21 immediately will begin to cool. This cooling has an immediate effect on reducing the voltage on the output terminal 30 of the operational amplifier 26. This is true as soon as the cooling drops below the saturated level which has been preselected as near the maximum temperature to which the thermocouple 21 would be exposed. This drop in voltage at terminal 30 is immediately reflected as a drop in voltage at the non-inverting terminal 42 of the operational amplifier 43. The terminal 44 has been clamped by the voltage on the capacitor 48 at a fixed level that does not follow the immediate downward movement. As a result of this, the terminal 42 drops below the voltage on the inverting terminal 44 of the operational amplifier 43, and the amplifier immediately switches once again changing the output terminal 45 to the negative or ground conductor potential on conductor 20. As soon as this switching action takes place, the base 56 of transistor 55 is reduced to substantially the voltage on conductor 20 and the transistor 55 is driven out of conduction. This immediately turns "off" the light emitting diode 62 and the relay 64. Thus, the flame out has been recognized, and the relay contacts associated with the realy 64 immediately respond to a reduction in the temperature at the thermocouple 21. The thermocouple 21 does not have to drop to a preset level before the relay 64 responds. The relay 64 responds to a rate or dimension of change due to the comparison of the voltage on terminals 44 and 42 of the operational amplifier 43. Since the voltage on terminal 44 is clamped by the voltage on the capacitor 48 any downward movement of the voltage on terminal 42 causes an immediate reaction by the relay 64 to drop out and protect the system.

The typical application of a thermocouple in a temperature monitoring system is to provide a continuous variation in output with the thermocouple and not a switching output at a comparator point, as is disclosed in the present invention. The present invention has wide application in the flame safeguard area to protect systems against the loss of flame without having the delay that would be normally expected of a thermocouple device as it cooled to some preset level. The present system could also be simplified by the elimination of the amplifier 11 if the comparator means 12 had sufficient sensitivity to operate directly off of the thermocouple 21. In the practical embodiment disclosed the amplifier means 11 has been disclosed along with the power supply means 10 even though one skilled in the art could readily design other configurations of circuits to utilize the comparator means 12, and the output switch means 13 in a thermocouple safety system of the type disclosed in the present invention.

Figure 2:
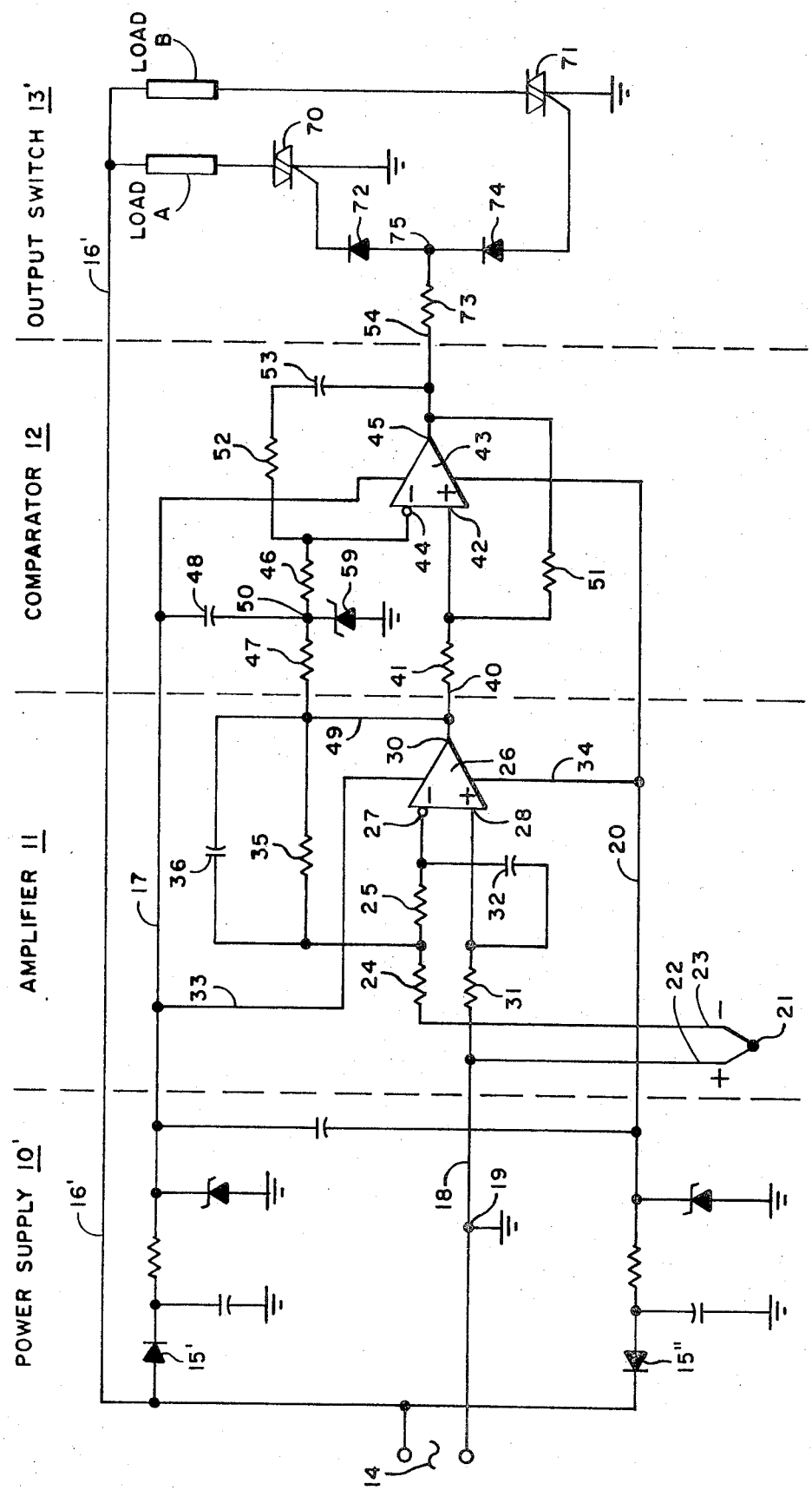
FIG. 2 is a modified form of the system.

The system disclosed in FIG. 1 can be modified to operate a pair of loads so that one load is energized upon a rising temperature at the thermocouple 21, while the other load is energized upon a falling temperature at the thermocouple 21. 21. This modified circuit is disclosed in detail in FIG. 2. FIG. 2 is substantially the same as FIG. 1 except for minor modifications in the power supply means 10 and the output switch means 13. These modifications of FIG. 1 will be discussed in connection with FIG. 2. It should be understood that the basic invention in the present system remains unchanged.

In FIG. 2 a modified power supply means 10' is disclosed. Alternating current potential 14 is again supplied to rectifiers 15' and 15". One of the conductors is now grounded at 19 and this ground is common with the conductor 18. The necessary capacitors, resistors, and Zener diodes are used in the power supply means 10' in a conventional fashion so that the power supply is modified to allow a zero voltage reference at ground or conductor 18. With this arrangement, the direct current and alternating current voltages have a common on conductor 18. A positive direct current potential is impressed on the conductor 17, while a negative direct current potential is impressed on conductor 20. Both of these voltage references are with respect to ground or conductor 18. This type of power supply, having a ground with a positive and negative reference voltage with respect to ground, is of a conventional design. One further modification is that the conductor 16 of FIG. 1 which supplied the potential for control of the output switch means 13 is now conductor 16' since it is connected directly to the alternating current supply 14 and supplies an alternating current voltage to the output switch means 13' so that a pair of loads can alternately be handled depending on whether the temperature at thermocouple 21 is rising or falling.

The comparitor circuit means 12 has been modified slightly by the addition of a Zener diode 59 from the junction 50 to ground. The addition of the Zener diode 59 is to provide a fixed maximum voltage level that can be applied to the terminal 44 of the amplifier 43, and this assists in controlling the flame flicker saturation effect in comparitor means 12. The addition of the Zener diode 59 does not change the basic function of the comparitor means 12 but merely improves its performance.

The output switch means 13' now contains a pair of loads A and B. In series with load A is a triac 70 and in series with load B is a triac 71. The gate of triac 70 is connected by a diode 72 to the resistor 73 which is in turn connected to the conductor 54. The gate of triac 71 is connected by a diode 74 to the common point 75 with the diode 72 and the resistor 73.

The output switch means 13' now consists of a pair of steering diodes 72 and 74 connected to the triac gates of triacs 70 and 71. If the conductor 54 is now at a potential of the conductor 20, which is negative compared to ground, current will flow through the gate of triac 71, to the voltage on conductor 54 turning "on" the triac 71 thereby energizing the load B. If the conductor 54 goes to the potential of conductor 17 (when the flame is detected at the thermocouple 21), it is now positive compared to ground, and current will flow through the gate of triac 70 and the steering diode 72 thereby energizing load A.

This modification allows for the alternating current available on conductor 16' to operate the loads A and B as functions of whether the temperature is rising or falling and uses the conductor 18 as a common or return for the direct current source.

The operation of amplifier means 11 and the comparator means 12 is unchanged and the change in the power supply means 10' and the output switch means 13' merely adjusts the power supply to a positive and negative with respect to ground so that two loads A and B can be operated by means of a pair of triacs 70 and 71 through the steering diodes 72 and 74.

It is quite obvious that other changes in the power supply and switching means can be accomplished along with changes in the amplifier means 11 and comparator means 12. For these reasons, the applicants wish to be limited in the scope of their invention solely by the scope of the appended claims.

The embodiments of the invention in which an exclusive property or right is claimed are defined as follows:

1. A temperature monitoring and control system including; power supply means adapted for operation of said system;
temperature responsive means adapted to be exposed to a temperature to be monitored and providing a voltage which is responsive to said temperature; comparator switch means having input means including delay circuit means and said temperature responsive voltage with said comparator switch means being energized from said power supply means; said comparator switch means further including output circuit means; and output switch means having an input connected to said comparator switch means output circuit means and an output connected to control a load; said load being energized upon an increased temperature being sensed by said temperature responsive means, and being deenergized upon said temperature responsive voltage decreasing by said comparator switch means comparing the voltage of said delay circuit means to said temperature responsive means voltage.

2. A temperature monitoring and control system, including; power supply means adapted for operation of said system; temperature responsive means adapted to be exposed to a temperature to be monitored and providing a voltage which is responsive to said temperature; amplifier means having input means and output means with said amplifier means being energized from said power supply means; said input means being connected to said temperature responsive means with said amplifier means being responsive to said temperature responsive means voltage to thereby have an amplified voltage output at said output means; comparator switch means having input means including delay circuit means connected to said amplifier means output and being energized from said power supply means; said comparator switch means further including output circuit means; and output switch means having an input connected to said comparator switch means output circuit means and an output connected to control load means; said load means being operated upon an increasing temperature being sensed by said temperature responsive means and beign reversably operated upon said temperature responsive means temperature decreasing by said comparator switch means comparing the voltage of said delay circuit means and said amplifier output voltage.

3. A temperature monitoring and control system as described in claim 2 wherein said power supply means is a direct current power supply means, and said temperature responsive means is a thermocouple.

4. A temperature monitoring and control system as described in claim 3 wherein said delay circuit means includes a capacitor to charge to a voltage level indicative of the output voltage of said thermocouple.

5. A temperature monitoring and control system as described in claim 4 wherein said amplifier means is an operational amplifier including negative feedback means.

6. A temperature monitoring and control system as described in claim 5 wherein said comparator switch means includes an operational amplifier having positive feedback means.

7. A temperature monitoring and control system as described in claim 6 wherein said output circuit means includes a transistor circuit which is switched by the operation of said comparator switch means; said transistor circuit further including a light emitting diode which emits an indicator light when said load means is energized.

8. A temperature monitoring and control system as described in claim 1 wherein said power supply means is a direct current power supply means, and said temperature responsive means is a thermocouple.

9. A temperature monitoring and control system as described in claim 8 wherein delay circuit means includes a capacitor that charges to a voltage level indicative of the output voltage of said thermocouple.

10. A temperature monitoring and control system as described in claim 9 wherein said comparator switch means includes an operational amplifier having positive feedback means.

* * * * *